United States Patent
Gao (10) Patent No.: US 9,652,198 B2
(45) Date of Patent: *May 16, 2017

(54) FIFO BUFFER CLEAN-UP

(71) Applicant: Western Digital Technologies, Inc., Irvine, CA (US)

(72) Inventor: Jianxun Gao, Ladera Ranch, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/812,933

(22) Filed: Jul. 29, 2015

(65) Prior Publication Data

US 2015/0331669 A1 Nov. 19, 2015

Related U.S. Application Data

(63) Continuation of application No. 14/018,715, filed on Sep. 5, 2013, now Pat. No. 9,122,424.

(60) Provisional application No. 61/847,614, filed on Jul. 18, 2013.

(51) Int. Cl.
*G06F 3/00* (2006.01)
*G06F 13/38* (2006.01)
*G06F 13/00* (2006.01)
*G06F 5/06* (2006.01)
*G06F 13/16* (2006.01)

(52) U.S. Cl.
CPC .......... *G06F 5/065* (2013.01); *G06F 13/1673* (2013.01); *G06F 2205/067* (2013.01)

(58) Field of Classification Search
None
See application file for complete search history.

(56) References Cited

U.S. PATENT DOCUMENTS

| | | | |
|---|---|---|---|
| 5,809,324 A * | 9/1998 | Yung | G06F 9/30061 712/218 |
| 6,223,174 B1 * | 4/2001 | Ladwig | G06F 17/30955 |
| 6,681,314 B1 | 1/2004 | Matsuo et al. | |
| 2004/0091114 A1 | 5/2004 | Carter et al. | |

(Continued)

OTHER PUBLICATIONS

U.S. Appl. No. 14/018,715, filed by Gao, Jianxun on Sep. 5, 2013.

(Continued)

*Primary Examiner* — Michael Sun
(74) *Attorney, Agent, or Firm* — Patterson & Sheridan, LLP (57) ABSTRACT

Systems and methods are disclosed for managing data entry buffers in a data storage device. A memory of the data storage device includes one or more data input ports. The device further includes a controller configured to receive a data entry over one of the data input ports and store the data entry in a first data structure (e.g., a FIFO data structure). The data entry is stored in the first data structure among other data entries received over various data input ports. The controller stores a data entry corresponding to the data entry stored in the first data structure in a second data structure. Entries in the second data structure include a valid bit field and one or more condition fields. The controller indicates, using a valid bit field of the second data structure data entry, that the corresponding data entry stored in the first data structure is valid.

20 Claims, 10 Drawing Sheets

(56) References Cited

U.S. PATENT DOCUMENTS

| 2007/0186057 | A1  | 8/2007 | Moll et al. | |
|---|---|---|---|---|
| 2007/0204130 | A1  | 8/2007 | Hass et al. | |
| 2011/0225334 | A1* | 9/2011 | Byrne | G06F 13/4027 |
| | | | | 710/110 |
| 2013/0158973 | A1* | 6/2013 | Hsiong | G06F 17/5022 |
| | | | | 703/14 |

OTHER PUBLICATIONS

Prosecution History from U.S. Appl. No. 14/018,715, from Nov. 18, 2014 through Apr. 30, 2015, 39 pp.

* cited by examiner

FIFO BUFFER CLEAN-UP

CROSS-REFERENCE TO RELATED APPLICATIONS

This application is a continuation of U.S. application Ser. No. 14/018,715, filed Sep. 5, 2013, which claims the benefit of U.S. Provisional Application No. 61/847,614, filed Jul. 18, 2013. The entire content of each of these applications is incorporated herein by reference.

BACKGROUND

Technical Field

This disclosure relates to computing systems. More particularly, the disclosure relates to systems and methods for managing data structures in a computing system.

Description of the Related Art

Data can be stored in computing systems in various data structures, such as first-in,-first-out (FIFO) data structures and the like. For example, a computing device may maintain one or more data structures for buffering data entries to be processed. Management of such data structures may involve complications when buffered data entries become outdated or invalid prior to processing.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure. Throughout the drawings, reference numbers may be reused to indicate correspondence between reference elements.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

In certain computing environments, one or more data structures are maintained as buffers for storing commands and/or data in an operational queue. Over time, various entries in such data structures may become invalid prior to the entries being dequeued. For example, in a shared logic design (such as, for example, a dual port controller), if reset occurs with respect to one of the ports, it may be necessary or desirable for data shared logic to be cleaned-up to prevent invalid entries associated with the reset port(s) from being executed on.

FIFO (First In, First Out) is a commonly used data structure for command/data buffering. In a FIFO implementation, data entries may be queued, wherein process is ordered according to a first-come, first-served behavior; that is, entries are removed from the queue (dequeued) in the order they were added to the queue (enqueued). Certain embodiments disclosed herein provide for the use of one or more FIFO data structures wherein, when reset or error occurs, one or more FIFO entries are cleaned-up before normal operation resumes. The present disclosure provides systems and methods for cleaning-up invalid entries in FIFO data structures.

Computing System

Figure 1:
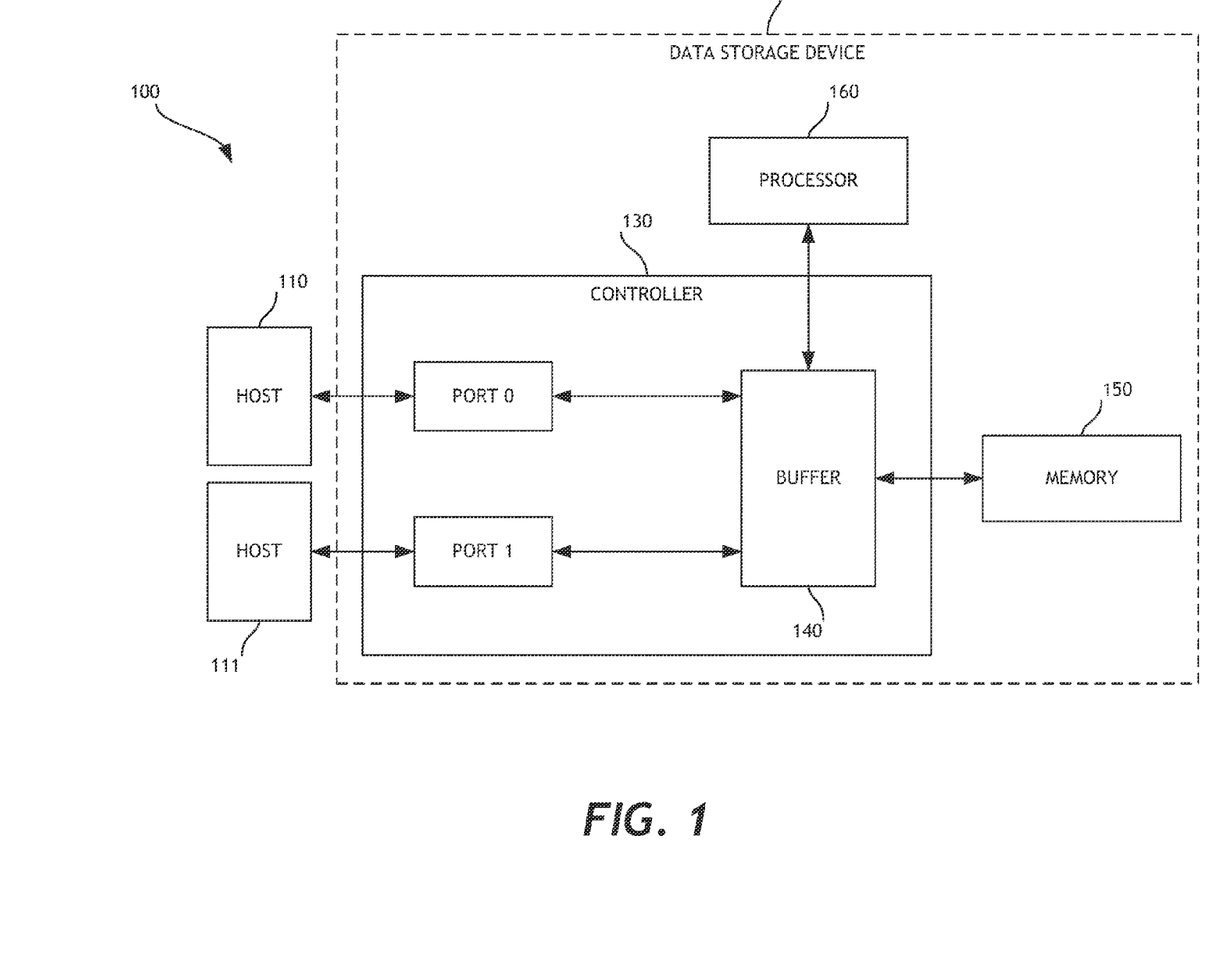
FIG. 1 is a block diagram illustrating an embodiment of a computing system.

FIG. 1 illustrates a computing system 100 utilizing shared instruction and/or data buffering logic. The system 100 includes a data storage device 105 which in one embodiment includes a controller 130 that interfaces two hosts 110, 111 to a buffer 140. The hosts 110, 111 may be, for example, host computers, data storage devices, or other peripheral devices or combinations thereof. As shown in FIG. 1, the first host device 110 is interfaced to the controller 130 of the data storage device 105 through a first channel or port, Port 0. Data may be transferred between the hosts 110, 111 and the controller 130 via one or more data buses. The second host device 111 is interfaced to the controller through a second channel or port, Port 1. The controller 130 may communicate with one or more processors 160, as shown. For example, the controller 130 may communicate with the processor 160 through a processor interface (not shown) using a standard interface, wherein the processor 160 is configured to receive data entries stored in the buffer 140 and process or execute the same. In one or more embodiments, the function(s) of processor 160 may be performed by the controller 130.

Certain instructions and/or data received by the controller 130 from the hosts 110, 111 are buffered in a shared data structure 140. In certain embodiments, the data structure 140 is a FIFO data structure, wherein buffered instructions and data are operated on once previously-buffered valid entries in the data structure have been cleared from the buffer. The buffer may be configured to transfer user data to and from the memory 150 in certain embodiments. In some embodiments, each of the buffer 140 and the memory 150 may be part of the controller 130 or external to the controller.

Figure 2:
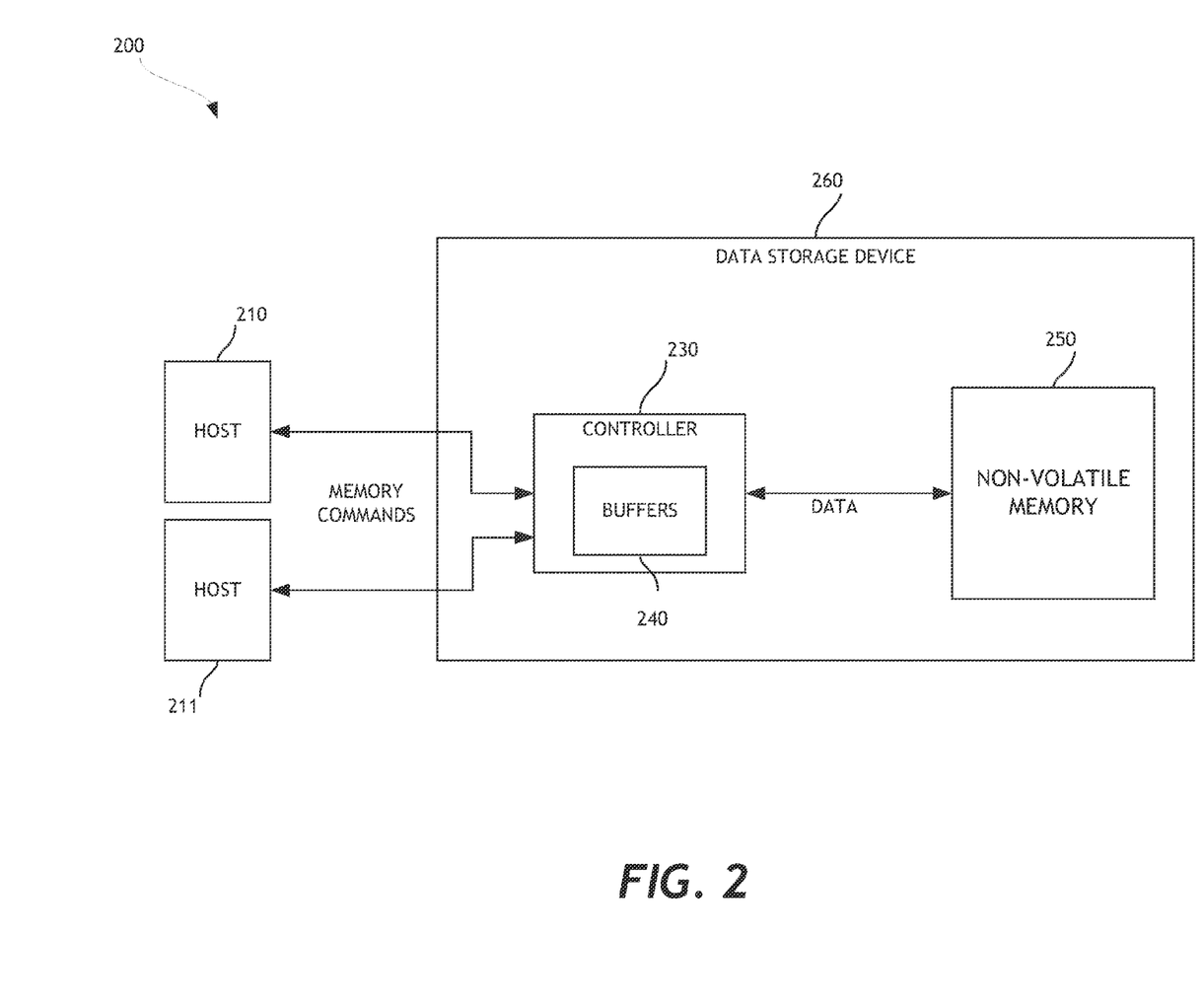
FIG. 2 is a block diagram illustrating an embodiment of a data storage system.

FIG. 2 is a block diagram illustrating a combination of one or more hosts 210, 211 with a data storage device 260 including one or more buffers for buffering host instructions and/or data. As shown, the data storage device 260 includes a controller 230, which in turn includes one or more volatile memory chips comprising one or more buffer data structures 240. In certain embodiments, the buffers 240 comprise FIFO data structures configured to implement improved buffer clean-up according to certain aspects of the present disclosure. In certain embodiments, the controller 230 is configured to receive memory access commands from storage interfaces (e.g., drivers) residing on the hosts 210, 211 and cache and execute commands according to a FIFO queue in the non-volatile memory 250. Data may be accessed/transferred based on such commands.

In certain embodiments, the non-volatile memory 250 may comprise rotating magnetic media, solid-state media, or a combination of rotating magnetic and solid-state media (e.g., in a hybrid storage drive).

FIFO Management

As described above, a computing system implementing FIFO buffer management may be configured to receive data and/or commands over a plurality of data input ports. Controller functionality according to one or more embodiments disclosed herein may provide port and/or virtual function (VF) reset and error handling using the following three-phase scheme: (1) Graceful Stop Phase: when port/VF reset and error event occurs, some or all modules may be configured to stop gracefully through hardware and/or firmware execution; (2) Clean-up Phase: affected data structures may be cleaned-up using hardware and/or firmware; and (3) Resume Phase: some or all modules may be permitted to resume normal operation. With respect to the second phase, clean-up of entries inside FIFO data structures may present certain difficulties for firmware. For example, firmware may generally not be able to perform such functions efficiently. Therefore, certain embodiments disclosed herein provide hardware solutions for FIFO entry clean-up.

Figure 3:
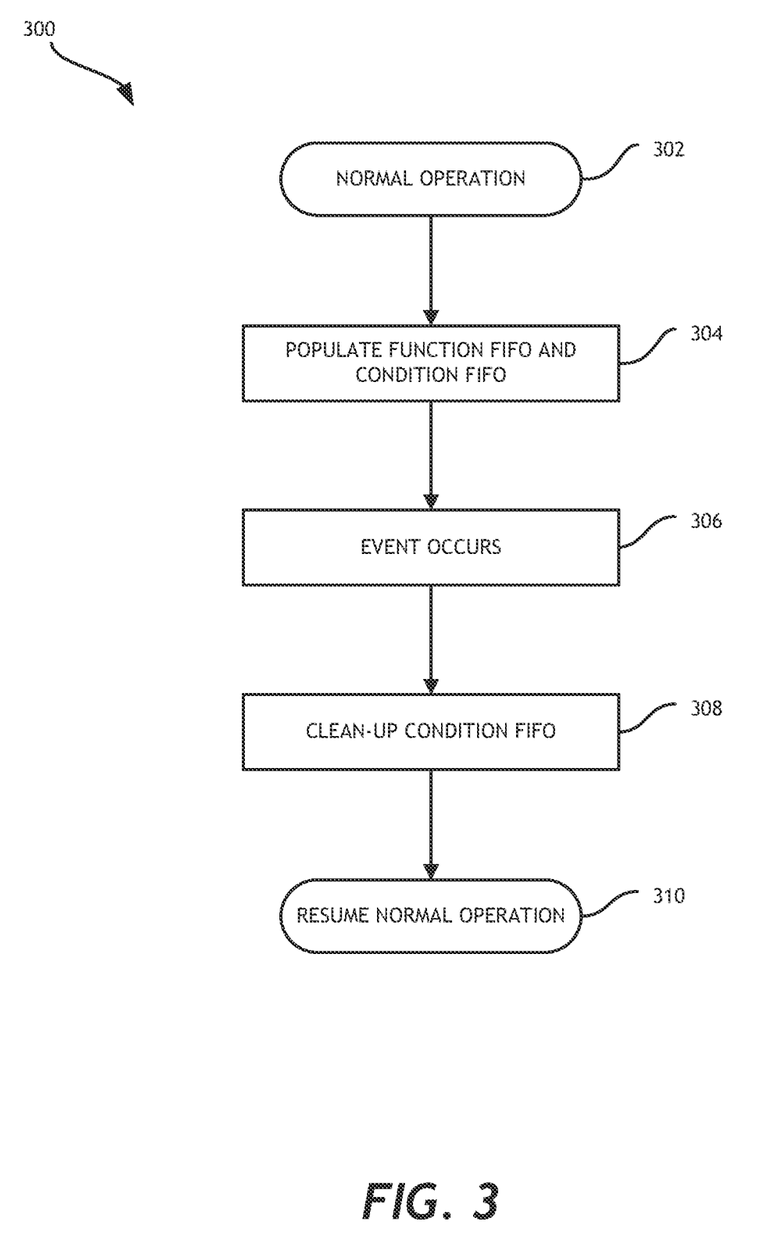
FIG. 3 is a flow diagram for an embodiment of a process of managing data structures in a computing system.

FIG. 3 is a flow diagram for an embodiment of a process 300 of managing data structures in a data storage device. According to the process 300, a data storage device is in a normal operating state at block 302. At block 304, the process 300 involves populating one or more function FIFOs and condition FIFOs. For example, as is described in greater detail below, a function FIFO may be utilized to buffer or store host commands or data for processing by the data storage device. Additionally, a condition FIFO may be utilized to track conditions associated with entries in the function FIFO. The condition FIFO may be used to determine whether entries in the function FIFO are valid.

At block 306, an event occurs that is related in some way to data entries stored in the function FIFO. For example, the event may be something that has a bearing on the validity of one or more entries of the function FIFO, such as a port reset or connection/power loss.

When an event occurs that affects the validity of buffered data entries in the function FIFO, it may be desirable to identify which entries in the function FIFO have been affected by the event in order to avoid wasting system resources processing/executing such entries. Therefore, in response to occurrence of the event at block 306, the process 300 involves performing clean-up of the condition FIFO to reflect that certain data entries affected by the event are invalid.

Once the condition FIFO has been cleaned up, the data storage device may resume normal operation, wherein, when processing data entries/commands from the function FIFO, the condition FIFO is queried to determine whether the function FIFO entries are to be processed, or are invalid. In certain embodiments, the process 300 is performed at least partially by the controller 130 or the controller 230, discussed above with respect to FIGS. 1 and 2, respectively.

Figure 4:
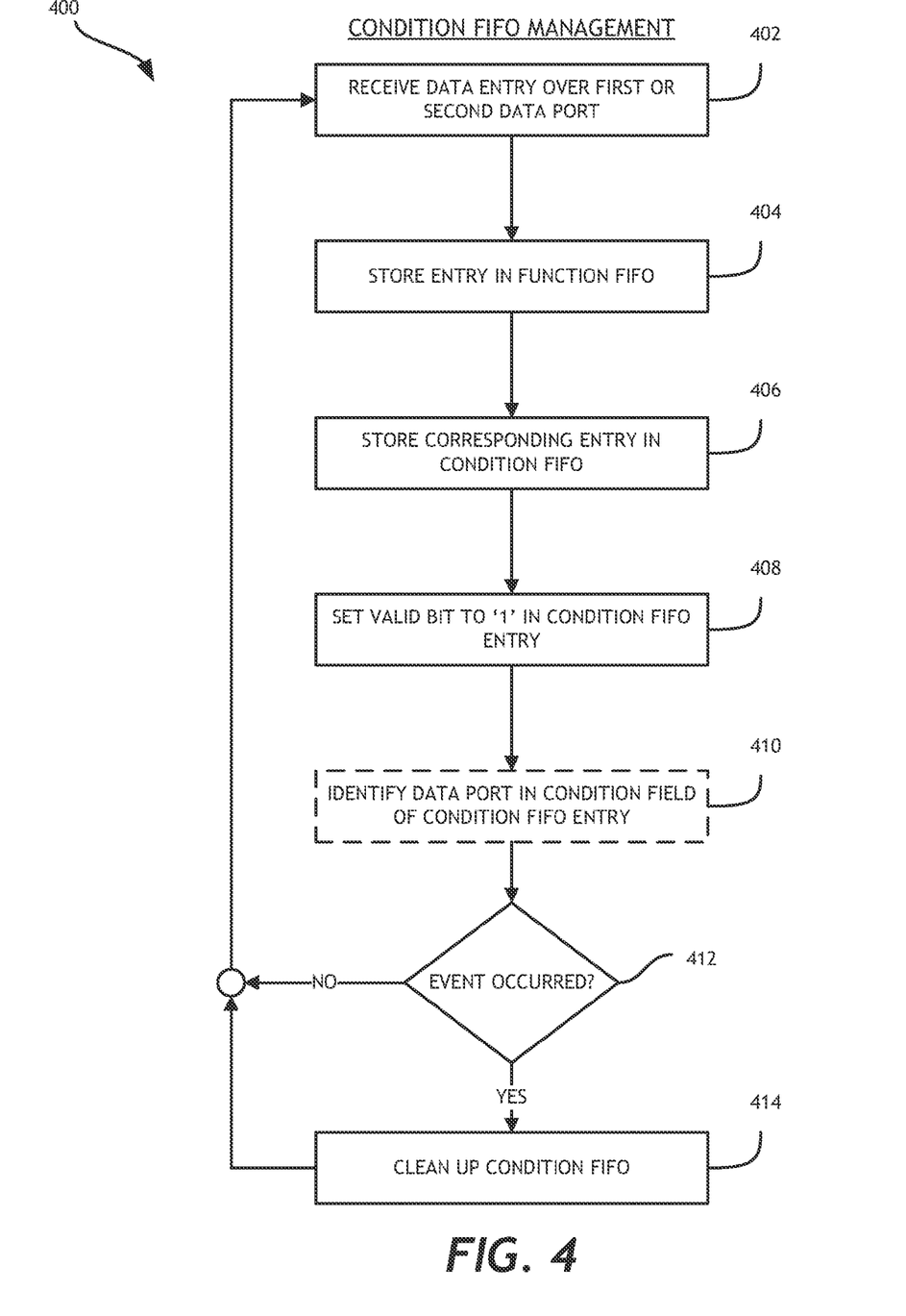
FIG. 4 is a flow diagram for an embodiment of a process of managing data structures in a computing system.

FIG. 4 provides a more detailed flow diagram for an embodiment of a process 400 of managing data structures in a computing system. In particular, the process 400 relates to management of a condition FIFO, as described herein, for tracking the validity of function FIFO entries.

With reference to FIG. 4, in a data storage device, data may be received over one or a plurality of data ports. For example, different data ports may correspond to data connections with different hosts and/or systems. A data entry received over one of the input ports may be stored in a data structure, such as a FIFO configured for storing host commands and/or other types of data entries, as shown at block 404. For every function FIFO entry, a corresponding system-generated data entry may also be stored in a second data structure, such as a FIFO (referred to herein as a "condition FIFO") having a substantially similar or identical number of entries as the function FIFO, as shown at block 406. With respect to data size, the condition FIFO may be much smaller than the function FIFO. In certain embodiments, condition FIFO entries include one or more fields for tracking conditions/information associated with function FIFO entries. For example, a valid entry field may be used to indicate whether respective corresponding references in the function FIFO are valid or not. In certain embodiments, as shown at block 408, the valid entry field may include a single bit, or other data unit, that is set to, for example '1' to indicate validity of the corresponding entry in the function FIFO. In an embodiment, a value of '0' in the valid bit field indicates that the entry is invalid. In yet another embodiment, a value of '0' represents valid, whereas '1' represents invalid.

In addition, the condition FIFO entries may also include one or more condition fields that may be set to indicate a condition of the corresponding entry in the function FIFO. For example, a condition field may indicate over what port among a plurality of ports the corresponding function FIFO entry was received. Condition fields may provide information relating to any system condition that may have a bearing on the validity of buffered data entries in the function FIFO. For example, an event may occur in the computing system that affects the validity of a subset of entries in the function FIFO. One or more condition FIFO fields may be used to identify which among the function FIFO entries is affected by the event by containing information identifying respective function FIFO entries as being associated with a particular condition.

As an example use of one or more condition fields, in an embodiment, the process 400 includes identifying the data port over which a data entry was received using a condition field of the corresponding condition FIFO entry. When an event occurs that may affect the validity of one or more function FIFO entries, the process 400 proceeds to block 414, where the condition FIFO is cleaned up to reflect the effect of the event on the validity of the function FIFO entries. For example, the valid bit field of entries in the condition FIFO corresponding to function FIFO entries that were rendered invalid by the event may be set to '0,' or otherwise identified using a valid entry field of the condition FIFO as being invalid. Once the condition FIFO has been cleaned up, the data storage device may resume normal operation.

When no validity-affecting event has occurred, the process 400 loops back to block 402. That is, the process 400 involves continued population of entries in the function and condition FIFOs while monitoring the system for occurrence of validity-affecting events. In certain embodiments, the process 400 is performed at least partially by the controller 130 or the controller 230, discussed above with respect to FIGS. 1 and 2, respectively.

Figure 5:
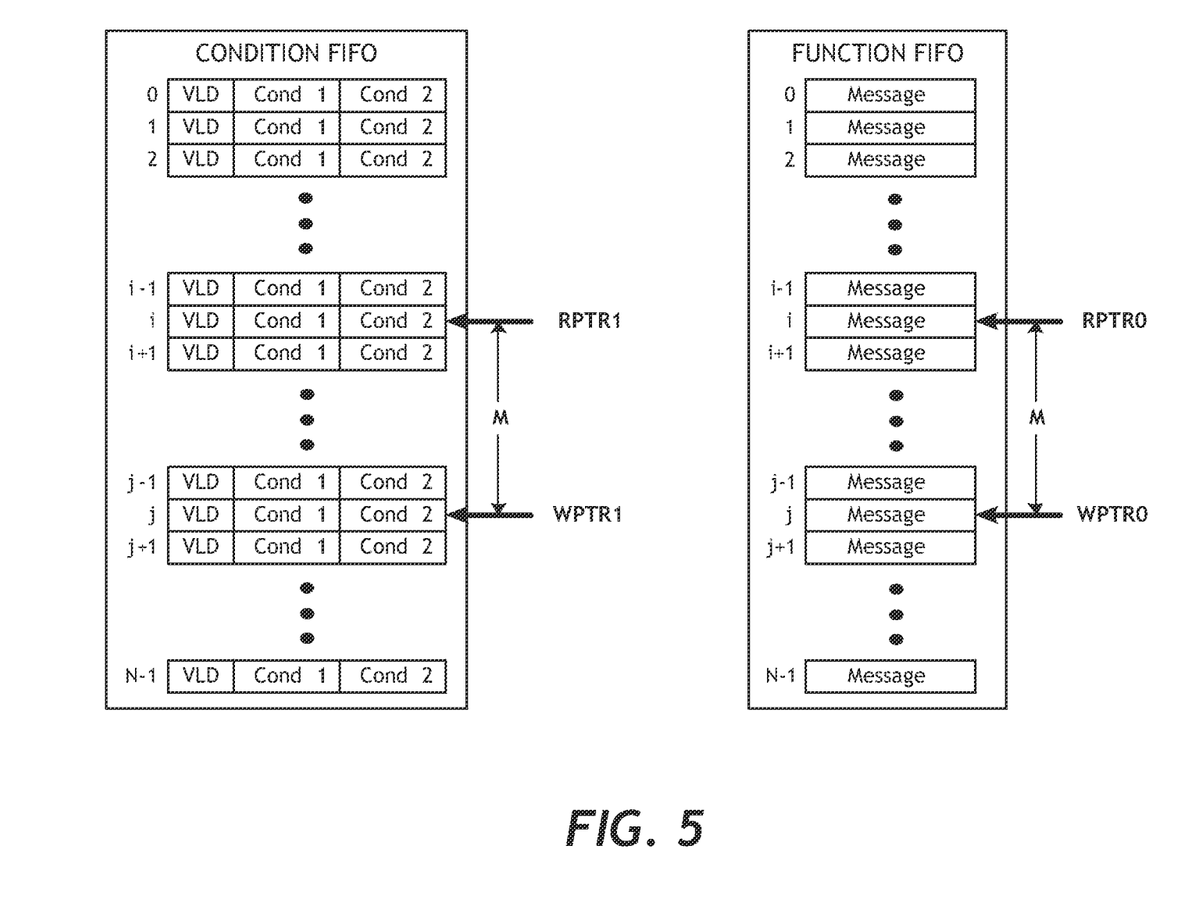
FIG. 5 is a block diagram illustrating data structures according to one embodiment.

FIG. 5 illustrates a FIFO solution utilizing a plurality of FIFO data structures according to one embodiment. The Function FIFO can be a FIFO for normal functional operation, as commonly implemented in buffer design. For example, the Function FIFO may be used to buffer data/commands received from one or more hosts. The Condition FIFO may be a non-functional FIFO used primarily for tracking the status of Function FIFO entries, rather than for functional operation.

As shown, the Function FIFO may comprise a plurality of message entries, which may contain host commands or other types of messages. While the illustrated FIFO shows one element per message, it should be understood that messages in the Function FIFO may be any suitable or desirable size. In certain embodiments, individual messages (or entries) may consist of multiple elements.

As described above, it may be desirable under certain conditions for certain entries in Function/Condition FIFOs to be cleaned-up in a clean-up phase. In certain embodiments, the various fields of the Condition FIFO shown in FIG. 5 may be represented as follows: VLD (valid bit) may indicate whether an associated entry in the Function FIFO is valid; Cond 1 and Cond 2 may refer to conditions that may be checked to determine if the associated entry in the Function FIFO is valid or not. While two condition fields are shown (Cond 1, Cond 2), any number of condition fields may be included. In certain embodiments, each entry may have as many conditions as desired or practical.

In certain embodiments, Cond 1 (or Cond 2) represents the same type condition for all entries. For example, Cond 1 might correspond to a port identification ID (PortID) identifying the port through which the relevant entry was received, and Cond 2 might correspond to virtual function identification number (VFID), or some other condition.

With respect to the Function FIFO, the write pointer WPTR0 points to a location in the Function FIFO where incoming messages/entries are stored. Therefore, the location of WPTR0 may be incremented or otherwise relocated after each write. The read pointer, RPTR0, on the other hand, marks the current location from which FIFO entries are dequeued; that is, in certain embodiments, RPTR0 points to the message that has been stored in the Function FIFO for the longest period of time without being processed. Therefore, RPTR0 is likewise incremented or otherwise relocated with each removal of a message from the FIFO.

During normal operation (functional operation), read pointer RPTR1 and write pointer WPTR1 of the Condition FIFO may be manipulated in a similar manner as the points RPTR0 and WPTR0 of the Function FIFO, which track the read and write addresses, respectively, of the Function FIFO. Furthermore, the Condition and Function FIFOs may have the same number of entries, with one-to-one correspondence of Function FIFO entries to Condition FIFO entries. According to one embodiment, in normal operation the pointers of the Condition FIFO and Function FIFO may operate wherein PRTR1=PRTR0 and WPTR1=WPTR0 at some or all times.

During operation, a value (e.g., '1') may be written to the VLD field in the Condition FIFO when a corresponding entry in the Function FIFO is written. When reading the Function FIFO, the system may be configured to check the VLD field in the corresponding Condition FIFO entry to determine if the VLD field is set to '0,' in which case the message to be read in the Function FIFO is indicated as being invalid.

In certain embodiments, the Condition FIFO is manipulated during the clean-up phase as follows: a FIFO Read is performed to move RPTR1 to WPTR1 (e.g., involving M number of operations, wherein RPTR1 and WPTR1 are separated by M entries); next, a Read-Compare-Write operation is performed to update the VLD field (e.g., N number of operations), for example, to indicate an entry is no longer valid due to a reset of a particular data port; the RPTR1 and WPTR1 move together. A FIFO Read operation may then be performed to move RPTR1 back to its original location (N-M operations). Finally, normal operation may be resumed.

Figure 6:
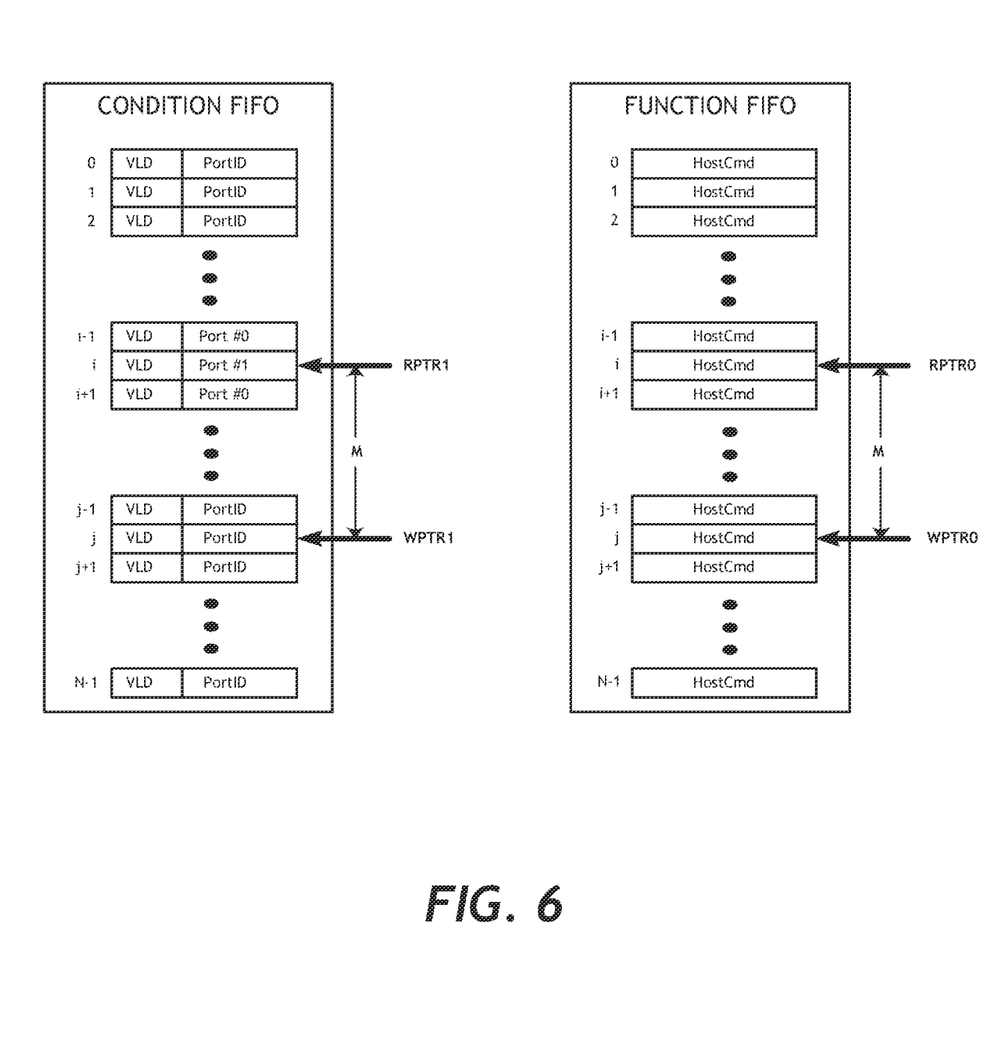
FIG. 6 is a block diagram illustrating data structures according to one embodiment.

FIG. 6 provides an illustration of an example implementation, wherein the relevant condition of interest recorded in the Condition FIFO is PortID, identifying a port over which a corresponding entry in the Function FIFO was received. The Function FIFO (or "Command" FIFO), may be configured to buffer host commands to be processed. As an example, the embodiment of FIG. 6 may correspond to a system in which the Command FIFO buffers commands received over two separate ports. A host command may be received from either of the two ports. For example, the HostCmd in an entry 'i−1' may be from Port 0, whereas the HostCmd in entry 'i' may be from Port 1 and the HostCmd in entry 'i+1' may come from Port 0, etc. FIG. 6 illustrates an example FIFO status representation when graceful stop is employed, in which the port information is used to invalidate certain entries associated with the port in which reset occurred, and the data storage device is able to in effect "clean-up" the Function FIFO by not executing the invalidated entries upon resumption of normal operation.

FIFO Clean-Up

Figure 7A:
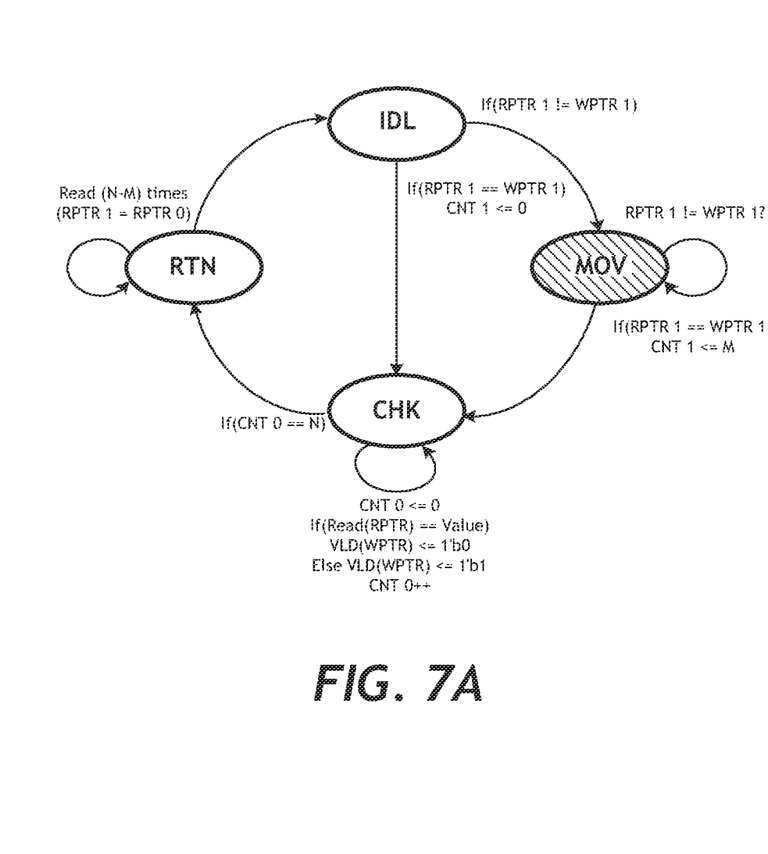
FIG. 7A illustrates a state diagram for a process of revising a data structure in accordance with one embodiment.
Figure 7B:
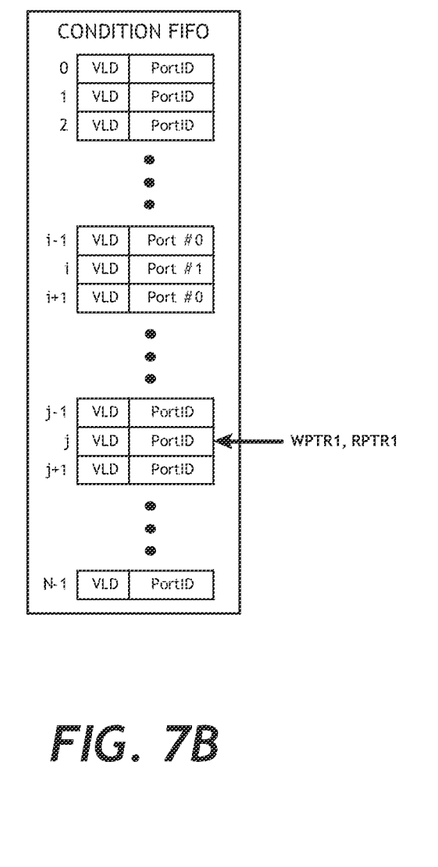
FIG. 7B is a block diagram illustrating a data structure according to one embodiment.

FIGS. 7A-9B, described in detail below, provide state diagrams illustrating possible steps in a condition FIFO clean-up process according to one or more embodiments. The Condition and/or Function FIFO data structures illustrated in FIGS. 7A-9B may be similar in function and/or configuration to those described above with respect to FIGS. 5 and 6. The state diagram of FIG. 7A illustrates a first state (identified as "MOV"), wherein a FIFO Read operation is performed M number of times to move RPTR1 to WPTR1. As shown, the state diagram loops at the "MOV" state until RPTR1 meets WPTR1, wherein RPTR1 is incremented after each read operation. FIG. 7B shows an example Condition FIFO in a condition where RPTR1 and WPTR1 have been brought into alignment after the "MOV" state.

Figure 8A:
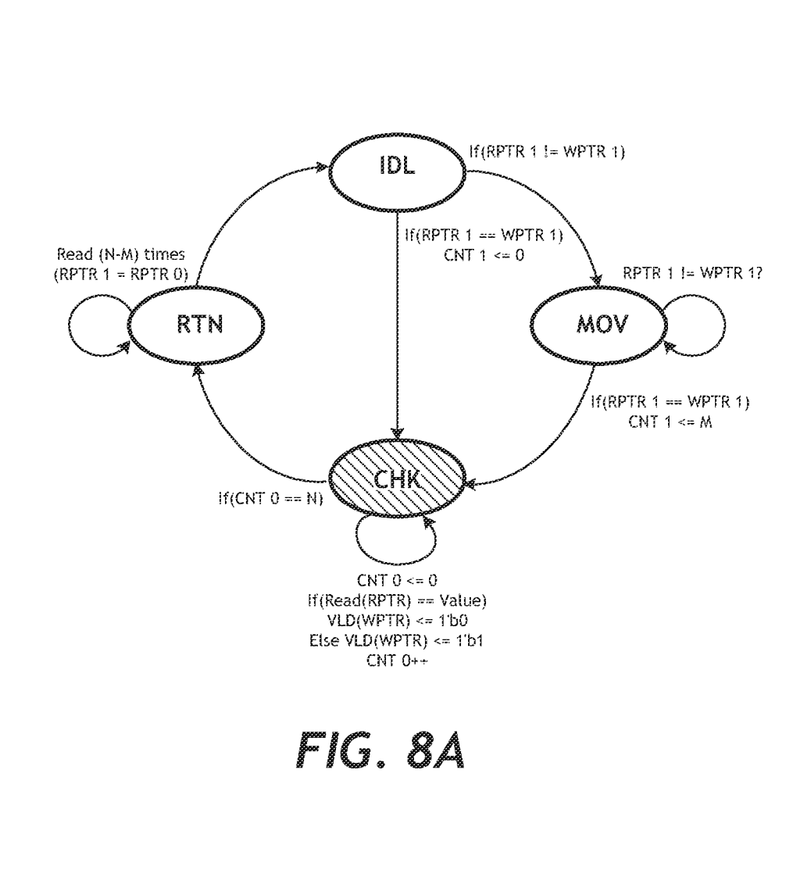
FIG. 8A illustrates a state diagram for a process of revising a data structure in accordance with one embodiment.
Figure 8B:
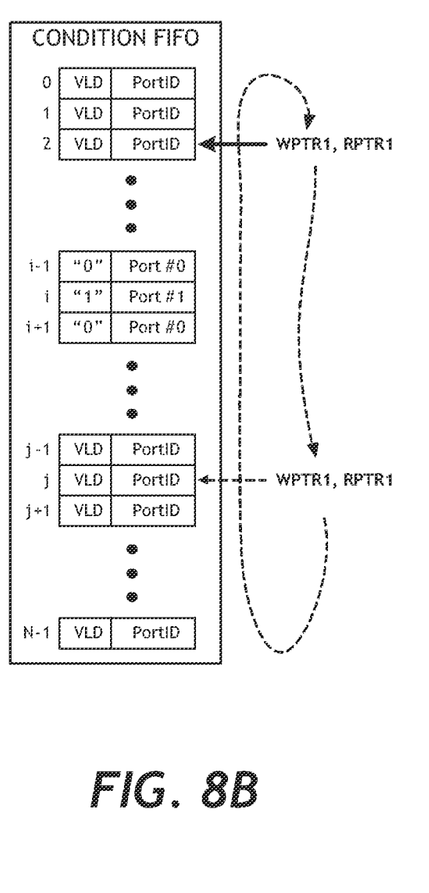
FIG. 8B is a block diagram illustrating a data structure according to one embodiment.

FIG. 8A illustrates a second state (identified as "CHK") in which a Read-Comp-Write operation is performed N number of times to update VLD bits in the Condition FIFO. That is, at each location, the associated entry is read out, one or more condition fields are compared to determine whether the validity field is to be updated, and, when update is required, writing a new value to the validity field. If, for example, Port 0 is reset, each entry may be read out and the respective PortIDs may be compared with Port 0. If matched, the associated VLD bit is written to, for example, '0;' otherwise, the VLD bit may remain as, for example, '1,' indicating that the entry is valid. In certain embodiments, it is desirable for the Read-Comp-Write to be performed in the same entry before manipulating the next entry. FIG. 8B shows the iteration of the Read-Comp-Write operation through the entries of the Condition FIFO, and the dotted line shows the movement of the pointers to accomplish the update of the entries.

Figure 9A:
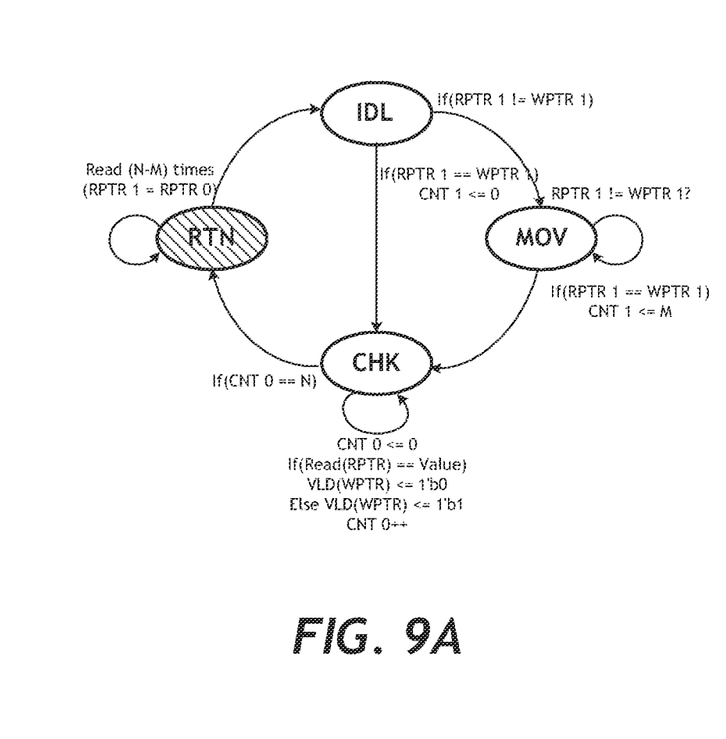
FIG. 9A illustrates a state diagram for a process of revising a data structure in accordance with one embodiment.
Figure 9B:
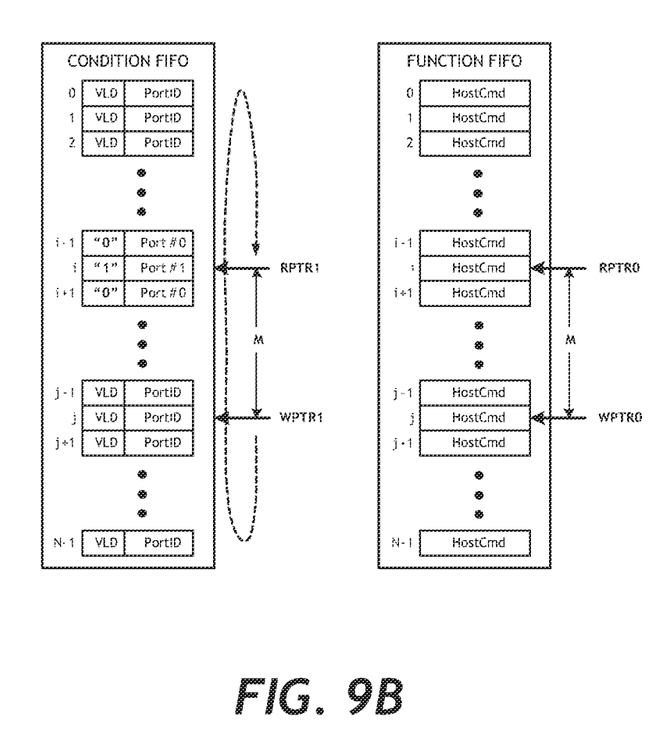
FIG. 9B is a block diagram illustrating data structures according to one embodiment.

FIG. 9A illustrates a third state (identified as "RTN") in which RPTR1 is returned to its original position. For example, this may be achieved by reading the Condition FIFO N-M times. If necessary, WPTR1 is also returned to its original position; in some embodiments, WPTR1 will have returned to its original position during processing while in the "CHK" state. After clean-up, the VLD bits in the Condition FIFO may be updated. Then, normal operation may resume. While stepping through the entries of the Function FIFO, depending on the various VLD bit values, invalid HostCmd entries, as indicated by the Condition FIFO entries, might be dropped or a different operation from normal operation may be implemented.

The various embodiments disclosed herein may provide improvements over existing systems by allowing for hardware solutions without substantial firmware interference. The features disclosed herein may be utilized in error handling, dual-port reset, virtual function reset and/or other operations.

Function FIFO Processing

Figure 10:
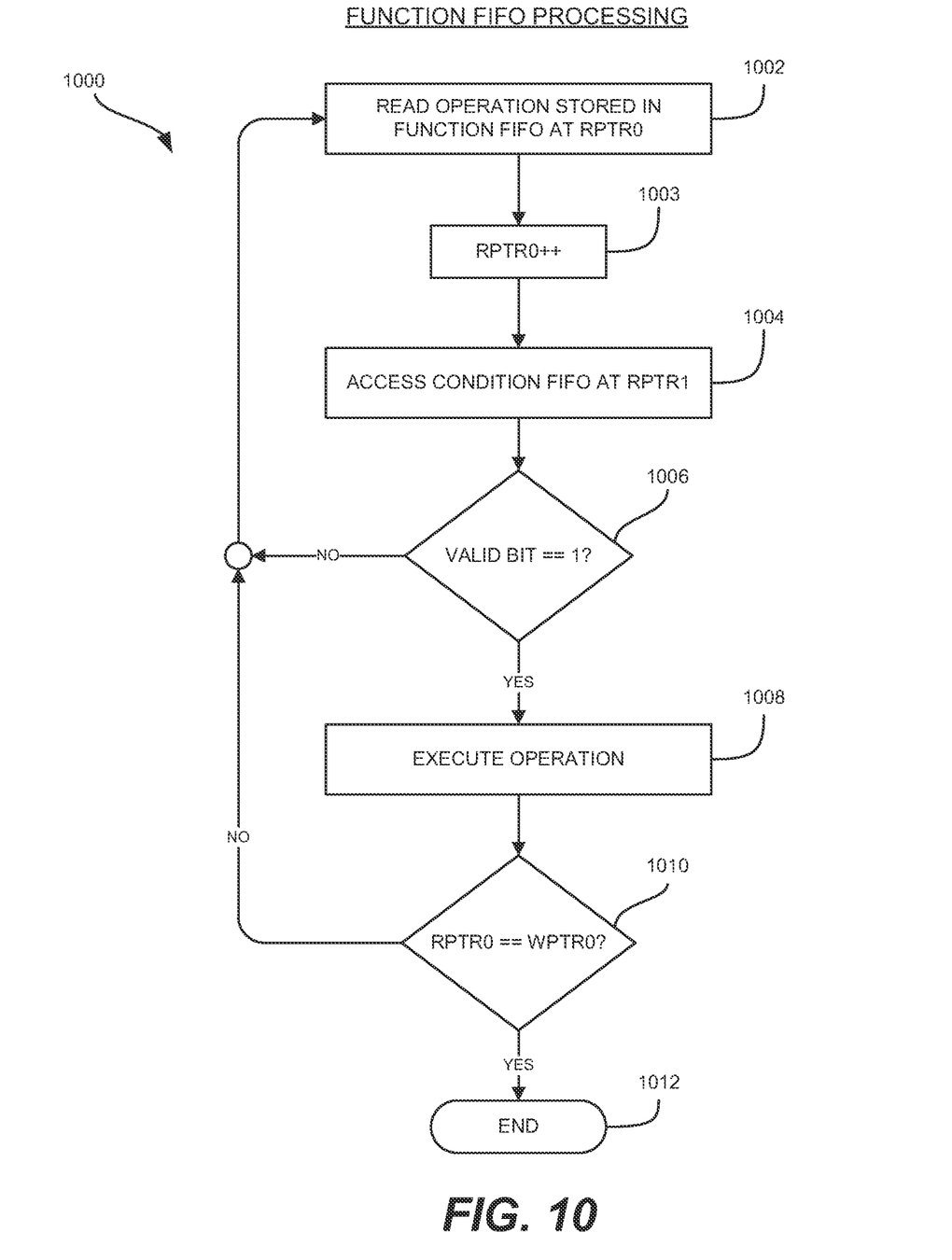
FIG. 10 is a flow diagram showing an embodiment of a process for executing operations in a computing system.

FIG. 10 is a flow diagram showing a process for executing operations in a data storage device according to one or more embodiments of the present disclosure. The process 1000 may be implemented in a data storage device utilizing FIFO data structures for data management. For example, a data storage device may be configured to process entries in a function FIFO, as described herein. In certain embodiments, the function FIFO includes host commands received from one or more hosts or systems. A processor may be configured to read commands or other data entries from the function FIFO in a sequential manner.

As described above, the function FIFO may be read at a location identified by a read pointer, which is referred to herein for convenience as 'RPTR0.' Prior to processing the function FIFO entry at RPTR0, the process 1000 may include referencing a corresponding entry in a condition FIFO data structure to determine whether the function FIFO entry is valid. For example, a corresponding pointer may be used to track the location of the corresponding condition FIFO entry, which is referred to herein for convenience as 'RPTR1.'

By checking a valid bit field of the condition FIFO entry, it may be determined whether the corresponding function FIFO entry is valid. For example, in an embodiment, if a valid bit is equal to '1,' as shown at blocks 1006 and 1008, the function FIFO entry is determined to be valid, and is executed by the processor.

When the function FIFO entry is not valid, the process 1000 involves incrementing the read pointer, RPTR0, so that the next entry in the function FIFO may be processed, without executing the invalid entry. This may help provide increased efficiency by preventing the wasting of resources executing invalid entries.

The process 1000 further involves determining whether the read pointer of the function FIFO, RPTR0, points to the same location as the write pointer of the function FIFO, WPTR0. If so, then no entries in the function FIFO remain to be processed, and the process 1000 ends at block 1012. If the two pointers do not point to the same location, then entries remain to be processed in the function FIFO, and the process 1000 returns to block 1002.

Other Variations

As used in this application, "non-volatile memory" may refer to solid-state memory such as, but not limited to, NAND flash. Alternatively or additionally, "non-volatile memory" may refer to more conventional hard drives and hybrid hard drives including both solid-state and hard drive components. The solid-state storage devices (e.g., dies) may be physically divided into planes, blocks, pages, and sectors, as is known in the art. Other forms of storage (e.g., battery backed-up volatile DRAM or SRAM devices, magnetic disk drives, etc.) may additionally or alternatively be used.

Those skilled in the art will appreciate that in some embodiments, other types of data storage systems and/or FIFO management can be implemented. For example, various embodiments may be extended to cover command/data from three or more ports. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A device comprising:
   a controller configured to:
   receive a first data entry over a first input port;
   store the first data entry in a first data structure in a memory;
   store a second data entry corresponding to the first data entry in a second data structure in the memory, wherein the second data structure is separate from the first data structure, and wherein entries of the second data structure include a valid bit field; and
   indicate, using the valid bit field of the second data entry in the second data structure, that the first data entry in the first data structure is valid.

2. The device of claim 1, wherein the entries of the second data structure further include at least one condition field.

3. The device of claim 2, wherein a condition value stored in the at least one condition field indicates that the first data entry was received over the first input port.

4. The device of claim 2, wherein the at least one condition field is configured to store a port identification value.

5. The device of claim 1, further configured to:
   receive a third data entry over a second input port, the third data entry and first data entry being of a same type of data entry;
   store the third data entry in the first data structure in the memory;
   store a fourth data entry corresponding to the third data entry in the second data structure; and indicate, using a valid bit field of the fourth data entry, that the third data entry is valid.

6. The device of claim 1, further configured to:
receive a signal indicating that an event related at least in part to the first input port has occurred; and
in response, indicate, using the valid bit field of the second data entry, that the first data entry is invalid.

7. The device of claim 6, further configured to, in response to receiving the signal indicating that the event related at least in part to the first input port has occurred, update valid bit fields of one or more additional entries of the second data structure to indicate that entries of the first data structure that were received over the first input port are invalid.

8. The device of claim 7, configured to locate the valid bit fields to be updated using condition fields that indicate that the one or more additional entries were received over the first input port.

9. The device of claim 1, further configured to:
receive a signal indicating that an event affecting a validity status of a subset of entries stored in the first data structure has occurred; and
in response, indicate, using valid bit fields of corresponding data entries associated with the subset of entries stored in the second data structure, that the subset of entries are invalid.

10. The device of claim 1, wherein a first set of data entries stored in the first data structure comprise instructions, wherein the controller is further configured to:
determine whether each of the first set of data entries stored in the first data structure is valid by checking a valid bit field of each of a second set of data entries stored in the second data structure, each of the first set of data entries corresponding to one of the second set of data entries; and
execute only valid data entries of the first set of data entries.

11. The device of claim 1, wherein the first data structure is a FIFO data structure.

12. A method of managing data in a data storage system, the method comprising:
receiving, by a controller, a first data entry of a first type over a first input port;
storing, by the controller, the first data entry in a first data structure stored in a memory array configured to store data entries of the first type;
storing, by the controller, a second data entry corresponding to the first data entry in a second data structure in the memory, wherein the second data structure is separate from the first data structure, wherein entries of the second data structure include a valid bit field; and
indicating, by the controller, using a valid bit field of the second data entry in the second data structure, that the first data entry in the first data structure is valid.

13. The method of claim 12, further comprising:
receiving, by the controller, a third data entry of the first type over a second input port;
storing, by the controller, the third data entry in the first data structure;
storing, by the controller, a fourth data entry corresponding to the third data entry in the second data structure; and
indicating, by the controller, using a valid bit field of the fourth data entry, that the third data entry is valid.

14. The method of claim 12, further comprising:
receiving, by the controller, a signal indicating that an event related at least in part to the first input port has occurred; and
indicating, by the controller, using the valid bit field of the second data entry, that the first data entry is invalid.

15. The method of claim 14, further comprising updating, by the controller, valid bit fields of one or more additional entries of the second data structure to indicate that entries of the first data structure that were received over the first input port are invalid.

16. The method of claim 12, further comprising:
receiving, by the controller, a signal indicating that an event affecting a validity status of a subset of entries stored in the first data structure has occurred, and
indicating, by the controller, using valid bit fields of corresponding data entries associated with the subset of entries stored in the second data structure, that the subset of entries are invalid.

17. The method of claim 12, wherein a first set of data entries stored in the first data structure comprise instructions, the method further comprising:
determining, by the controller, whether each of the first set of data entries stored in the first data structure is valid by checking valid bit fields of each of a second set of data entries stored in the second data structure, each of the first set of data entries corresponding to one of the second set of data entries.

18. The method of claim 12, wherein the first data structure is a FIFO data structure.

19. A data storage device comprising:
a memory;
a first input port; and
a controller configured to:
receive a first data entry over the first input port;
store the first data entry in a first data structure in the memory;
store a second data entry corresponding to the first data entry in a second data structure in the memory, wherein the second data structure is separate from the first data structure, and wherein entries of the second data structure include a valid bit field; and
indicate, using the valid bit field of the second data entry in the second data structure, that the first data entry in the first data structure is valid.

20. A non-transitory computer readable storage medium comprising instructions that, when executed, cause a controller to:
receive a first data entry over a first input port;
store the first data entry in a first data structure in a memory;
store a second data entry corresponding to the first data entry in a second data structure in the memory, wherein the second data structure is separate from the first data structure, and wherein entries of the second data structure include a valid bit field; and
indicate, using the valid bit field of the second data entry in the second data structure, that the first data entry in the first data structure is valid.

* * * * *